US012730696B2

(12) United States Patent
Savolainen

(10) Patent No.: US 12,730,696 B2
(45) Date of Patent: Sep. 8, 2026

(54) EARLY WARNING MECHANISM ON DATABASE MANAGEMENT SYSTEM WORKLOAD

(71) Applicant: DB PRO OY, Helsinki (FI)

(72) Inventor: Jani K. Savolainen, Helsinki (FI)

(73) Assignee: DB PRO OY, Helsinki (FI)

( * ) Notice: Subject to any disclaimer, the term of this patent is extended or adjusted under 35 U.S.C. 154(b) by 21 days.

(21) Appl. No.: 19/042,061

(22) Filed: Jan. 31, 2025

(65) Prior Publication Data

US 2025/0173203 A1 May 29, 2025

Related U.S. Application Data

(63) Continuation-in-part of application No. 18/296,745, filed on Apr. 6, 2023, now abandoned.

(30) Foreign Application Priority Data

Apr. 11, 2022 (FI) ..................................... 20225316

(51) Int. Cl.
*G06F 11/00* (2006.01)
*G06F 16/21* (2019.01)

(52) U.S. Cl.
CPC .......... *G06F 11/004* (2013.01); *G06F 16/217* (2019.01); *G06F 2201/80* (2013.01)

(58) Field of Classification Search
CPC ............... G06F 11/004; G06F 11/0781; G06F 11/3428; G06F 11/079; G06F 11/0766;
(Continued)

(56) References Cited

U.S. PATENT DOCUMENTS

2011/0161048 A1 6/2011 Sodem et al.
2013/0262685 A1* 10/2013 Shelton .............. G06F 11/3072 709/226

(Continued)

OTHER PUBLICATIONS

Finnish Search Report issued by the Finnish Patent and Registration Office in relation to Finnish Application No. 20225316 dated Jan. 23, 2023 (1 page). *cited in parent.

(Continued)

*Primary Examiner* — Joseph D Manoskey
(74) *Attorney, Agent, or Firm* — Robert P. Michal, Esq.; Rimon PC

(57) ABSTRACT

A method for determining early warning on workload in a database system includes collecting periodically data samples concerning a plurality of performance counters and determining periodically one or more data points representing a statistical characteristic of said data samples over a first time period. Based on a plurality of said data points, trend points for each of a plurality of performance counter components are determined, said trend points representing a statistical characteristic determined on basis of the respective data points. Each performance counter component's current trend, determined based on the trend points over a second time period, is compared to a determined baseline trend of the same performance counter component. Any significant deviations determined based on comparisons of the current trends and the baseline trends are classified into severity classes, and an early warning of a possible future problem in the DBMS system is given.

16 Claims, 7 Drawing Sheets

(58) Field of Classification Search
CPC ............. G06F 11/0784; G06F 11/0727; G06F 11/3034; G06F 11/3409; G06F 11/3452; G06F 16/217; G06F 2201/80
See application file for complete search history.

(56) References Cited

U.S. PATENT DOCUMENTS

| | | | | |
|---|---|---|---|---|
| 2015/0332488 | A1 | 11/2015 | Beck et al. | |
| 2017/0364581 | A1 | 12/2017 | Harutyunyan | |
| 2020/0133760 | A1 | 4/2020 | Volkov | |
| 2020/0134069 | A1 | 4/2020 | Chennen | |
| 2020/0319956 | A1 | 10/2020 | Upadhyay | |
| 2021/0081298 | A1 | 3/2021 | Gardner | |
| 2021/0216848 | A1 | 7/2021 | Poghosyan et al. | |
| 2022/0004563 | A1* | 1/2022 | Ghosh ................. | G06F 11/3476 |
| 2022/0083445 | A1 | 3/2022 | Nyati et al. | |
| 2023/0229537 | A1* | 7/2023 | Harutyunyan ........ | G06F 11/079 714/26 |

OTHER PUBLICATIONS

Finnish Office Action issued by the Finnish Patent and Registration Office in relation to Finnish Application No. 20225316 dated Jan. 23, 2023 (9 pages). *cited in parent.
James Bouhana et al: "Automated Discovery of Performance Envelopes", Internet Monitoring and Protection, 2007. ICIMP 2007. Second International Conference on, IEEE; PI, Jul. 1, 2007 (Jul. 1, 2007), pp. 17-17, XP031115486, ISBN: 978-0-7695-2911-0. *cited in parent.
Extended European Search Report dated Aug. 18, 2023, issued in corresponding European Application No. 23167328.6, 6 pages. *cited in parent.
Office Action issued by the USPTO in relation to U.S. Appl. No. 18/296,745 dated Jul. 3, 2024 (23 pages).
Office Action issued by the USPTO in relation to U.S. Appl. No. 18/296,745 dated Nov. 5, 2024 (19 pages).

* cited by examiner

Early warnings

| Source | Counter | Slope | | Volatility | | Skew | | Kurtosis | |
|---|---|---|---|---|---|---|---|---|---|
| MY_DOMAIN.SOURCEDB2 | CPU USAGE % (MAX) | +179% | R | +70% | Y | -125% | G | +17% | G |
| MY_DOMAIN.AGREPLICA01 | PROCESSOR QUEUE LENGTH (AVG) | +90% | Y | +17% | G | +88% | Y | -91% | G |
| MY_DOMAIN.AGREPLICA03 | CPU USAGE % (AVG) | -37% | G | +27% | G | -44% | G | +69% | Y |
| MY_DOMAIN.AGREPLICA01 | PROCESSOR QUEUE LENGTH (MAX) | +76% | Y | +23% | G | -121% | G | -74% | G |
| MY_DOMAIN.AGREPLICA01 | CPU USAGE % (AVG) | +90% | Y | 0% | G | -192% | G | -31% | G |
| MY_DOMAIN.AGREPLICA01 | CPU USAGE % (MAX) | +76% | Y | +77% | Y | -143% | G | -188% | G |
| MY_DOMAIN.SOURCEDB2 | PROCESSOR QUEUE LENGTH (MAX) | +179% | R | +26% | G | -300% | G | -162% | G |
| MY_DOMAIN.AGREPLICA03 | CPU USAGE % (MAX) | -95% | G | +64% | Y | -314% | G | -21% | G |
| MY_DOMAIN.AGREPLICA02 | CPU USAGE % (AVG) | -578% | G | +25% | G | -153% | G | +98% | Y |
| MY_DOMAIN.SOURCEDB1 | PROCESSOR QUEUE LENGTH (AVG) | -395% | G | +75% | Y | -563% | G | +2% | G |
| MY_DOMAIN.GOVDB16 | PROCESSOR QUEUE LENGTH (AVG) | -1887% | G | -2% | G | +126% | R | -198% | G |
| MY_DOMAIN.GOVDB16 | PROCESSOR QUEUE LENGTH (MAX) | -18123% | G | +34% | G | +21% | G | +57% | Y |

Fig. 7

EARLY WARNING MECHANISM ON DATABASE MANAGEMENT SYSTEM WORKLOAD

CROSS-REFERENCE TO RELATED APPLICATION

This application is a continuation in part of U.S. patent application Ser. No. 18/296,745 filed Apr. 6, 2023, which claims priority to Finnish Patent Application No. 20225316, filed Apr. 11, 2022, the disclosure of these applications are expressly incorporated herein by reference in their entirety.

FIELD

The present invention relates to a method, a system and a computer program product related to workload monitoring in a computer system. More particularly, a method, a system and a computer program product are provided for predictive performance monitoring of a database management system (DBMS), in particular database servers thereof, and especially to a system, method and a computer program product for recognizing and predicting changes in statistical nature of workloads that may degrade system performance.

BACKGROUND

It is difficult to foresee long-term hardware performance problems when monitoring tens of different DBMS performance counters such as server central processing unit (CPU) usage %, processor queue, random access memory (RAM) utilization, instance memory page life expectancy (PLE), latch wait time, batch requests/sec, database storage I/O, throughput, memory plan cache size, buffer pool size, to name a few. This often leads into a situation, wherein subtle changes in the DBMS server workload profile start to excessively consume physical hardware resources and potentially slow down the system or risk overall performance and availability of the system.

Typically, DBMS monitoring software has predefined baseline values set for "normal" performance counter workloads. Threshold points, such as statistically determined warnings and alert thresholds, are used to determine what is "normal" value and what is beyond "normal". For example, if server CPU usage % exceeds 80% over 5 consecutive minutes there will be a warning and if the server CPU usage % exceeds 90% there will be an alert. Weakness in such alerting is that it is black-and-white as well as reactive: Only when the workload indicates that something seems to be really wrong at the moment, there will be an alert.

In some more advanced monitoring mechanisms, various trends are compared against existing performance counter workload, which results in better understanding of the average momentum of the workload over time in near future, therefore being more proactive and giving a database administrator (DBA) more time to react potential problem. For example, if there is a CPU usage % in consecutive minutes in level of: 5, 10, 20, and 40, most likely the fifth minute will be on 80% mark and therefore should give an alert.

But still, the above mentioned alerting mechanisms are not able to predict more complex, subtle changes in the DBMS workloads, which may cause performance problems in the hardware now or in the future. For that purpose, we need more advanced statistical analysis.

DESCRIPTION OF THE RELATED ART

Patent application US2021216848 discloses a system monitoring and management tool and method that is based on generation an anomaly signal from time-series data collected from components of a computer system.

SUMMARY

An object is to provide a method and apparatus so as to provide an improved early warning method, where at least one of the disadvantages is eliminated or at least alleviated. The objects of the present invention are achieved with a method, a system and a computer program product according to the characterizing portion of independent claims. The preferred embodiments of the invention are disclosed in the dependent claims.

The present invention is based on the idea of comparing current trends of a plurality of performance counter components to respective baseline trends representing the same performance counter component over a longer time period. In this context, performance counter components are determined as a variety of statistical characteristics of a respective performance counter metric.

According to a first method aspect, a computer-implemented method is provided, comprising collecting periodically a plurality of data samples concerning a plurality of performance counters of a database management system, DBMS, said performance counters comprising at least one of CPU usage and processor queue length, and determining periodically one or more data points, wherein each data point represents statistical characteristic, such as average or peak value, of one of said performance counters, said statistical characteristic being determined based on a plurality of said data samples taken over a first time period, and storing said data points. The method further comprises, based on a plurality of said data points, periodically determining and storing a trend point for each of a plurality of performance counter components. The performance counter component represents a statistical characteristic of the respective performance counter, determined based on the plurality of data points stored over a second time period. The performance counter component is selected from a group comprising slope, volatility, skewness and kurtosis. The method further comprises determining a current trend of each of the plurality of performance counter components based on a plurality of respective trend points. The current trend comprises all trend points determined during the second time period, which is longer than the first time period. The method further comprises determining a baseline trend for each of said plurality of performance counter components. The baseline trend comprises a plurality of trend points of the respective performance counter component over a third time period, which is longer than the second time period. The method comprises comparing each determined current trend to the respective baseline trend, and, upon detecting a deviation of the current trend from the respective baseline trend that exceeds at least one threshold, categorizing the deviation into one of a plurality of severity classes selected from a group comprising a warning, an alert and a critical alert. The method also comprises providing an early warning of a possible future problem in the DBMS system based on number of said deviations concerning at least two different performance counter components of any single performance counter being categorized into at least one of said severity classes.

According to a second method aspect, thresholds applied to categorizing a deviation to one of the severity classes are determined individually for each DBMS performance counter component.

According to a third method aspect, said thresholds applied for categorizing a deviation to one of the severity classes are adjusted using machine learning wherein the machine learning is taught using historical performance counter data and actual performance problems detected in a DBMS.

According to a fourth method aspect, said thresholds applied for categorizing a deviation to one of the severity classes are determined statistically based on the respective baseline trend.

According to a fifth method aspect, an early warning is categorized based on number of said deviations being categorized into a warning and/or on number of said deviations being categorized into an alert and/or number of said deviations being categorized into a critical alert and/or total number of said deviations being categorized in any of the severity classes indicating an alert.

According to a sixth method aspect, the first period is an hour or less than an hour, wherein new trend points are determined daily, wherein the second period is a month, and the third period is at least 3 months.

According to a seventh method aspect, the third time period immediately precedes the second time period, or the third time period and the second time period mutually overlap such that the latest data points used for determining the last trend point of the current trend and the baseline trend are the same data points.

According to an eighth method aspect, the new trend point for the current trend is determined periodically based on all data points stored over duration of a sliding window having length of the second period. The new trend point for the baseline trend is determined periodically based on all data points stored over duration of a sliding window having length of the third period.

According to a ninth aspect, future development of the current trend is extrapolated based on a plurality of recent trend points of the current trend for predicting whether the current trend forecasts appearing of a problem in near future.

According to another aspect, a computer program product is provided, comprising computer executable code which, when executed by a computer or computer system, performs the method according to any one of the above method aspects.

According to a further aspect, a computer readable medium is provided comprising computer executable code which, when executed by a computer or computer system, performs the method according to any one of the above method aspects.

The present invention has the advantage that it enables predicting complex and/or subtle changes in DBMS workloads, which may cause performance problems in the hardware now or only later in the future.

BRIEF DESCRIPTION OF THE DRAWINGS

In the following the invention will be described in greater detail, in connection with preferred embodiments, with reference to the attached drawings, in which

FIG. 7 illustrates an example of an early warning user interface.

DETAILED DESCRIPTION

Figure 1:
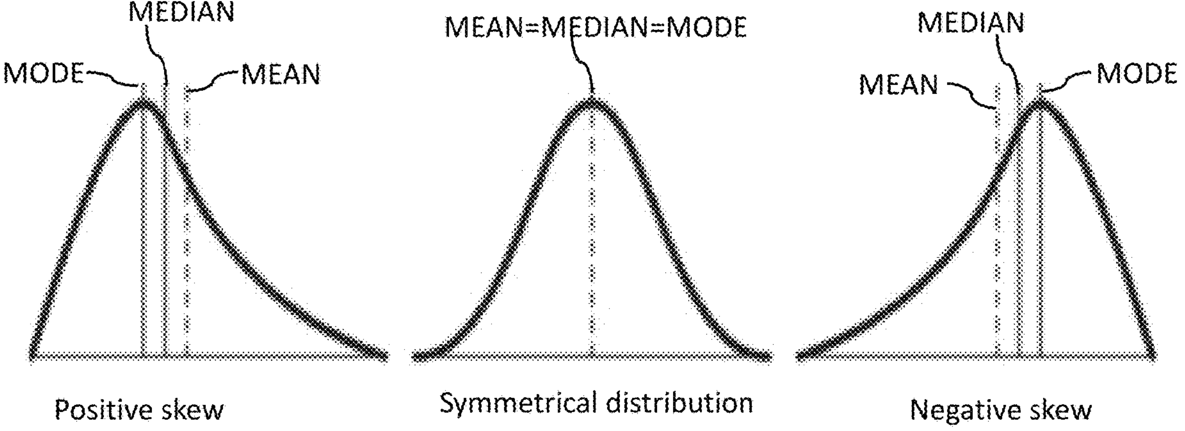
FIG. 1 illustrates skewness.

In this context, DBMS refers to Database Management System.

In this context, DBA refers to Database Administrator.

In this context, Processor queue refers to a collection of tasks in queue that are waiting to be processed by a central processor unit (CPU).

In this context, Page Life Expectancy (PLE) refers to an age of a data page in seconds in a buffer cache or a buffer memory after querying tables with a loading data page into the buffer cache or buffer memory. Page Life Expectancy value (PLE value) indicates memory pressure in allocated memory towards an SQL Server instance.

In this context, IOPS (Input/output operations per second) refers to an input/output performance measurement used to characterize computer storage devices like hard disk drives (HDD), solid state drives (SSD), and storage area networks (SAN). Like many other benchmarks, IOPS numbers published by storage device manufacturers do not directly indicate real-world application performance.

In this context, throughput (Input/output operations of data pages (MB) per second) refers to an input/output performance measurement used to characterize computer storage devices like hard disk drives (HDD), solid state drives (SSD), and storage area networks (SAN). Like many other benchmarks, IOPS numbers published by storage device manufacturers do not directly correspond to real-world application performance.

A great majority of DBMS workloads in various domains are clearly seasonal and therefore highly predictable for example on monthly basis. This seasonality enables dividing each performance counter into different performance counter components that describe characteristics of the workload over time on seasonal basis as a current trend. With performance counter components we refer to certain statistical characteristics of the performance counter, which will be discussed in more detail.

In the following description, a single example is used with typical time scales and time periods applicable to a typical DBMS system with monthly seasonality. As understood by a skilled person, the invention is not limited to updating the trends on daily basis and determining the current trend over a period of a month but is equally applicable to any other time spans. For example, the current trend can be determined biweekly, weekly or daily, or over a period that is longer than one month. All time periods can be adjusted for example based on known seasonality of workloads of the supervised DBMS.

Comparing the current trend of the performance counter component to a baseline trend of the respective performance counter component indicates whether the workload changes or not. The baseline trend is based on the same performance counter component as the current trend, both in the same system. The baseline trend is determined over data points covering a significantly longer time period than data points used for determining the current trend. The underlying idea is to compare a plurality of different current trends of various performance counter components against the respective baseline trends and see whether there is significant deviation between these trends. A warning or an alert is given for each performance counter component if the change of current trend exceeds a respective predefined threshold in comparison to the baseline trend. Thresholds (threshold values) may be determined as a predetermined absolute amount of deviation from the respective baseline trend or as a percentual difference from the baseline trend. A threshold for a warning should always be lower than threshold for an alert, so that a smaller change in a trend first causes a warning and a greater change in the trend causes an alert. In addition, number of warnings and alerts for different performance counter components of the same performance counter are used for determining severity of an overall early warning. The more of these trend comparisons cause a warning or alert, the higher the risk of future problems.

According to some embodiments, thresholds for warnings and/or alerts and/or critical alerts are determined using machine learning. The machine learning system can be taught using historical performance counter data and actual performance problems detected in a DBMS.

An example of a current trend is a series of daily determined and stored running average values of a performance counter component over a sliding window covering last month (i.e. last 30 days). This current trend is compared against a baseline trend determined likewise, but by a 3-month running average of the same performance counter component. Any statistical measure of a selected performance counter can be aggregated daily on basis of a plurality of data samples of the respective performance counter value. For example, data samples of the performance counter can be obtained every minute, and the performance counter data point, which itself is typically a statistical value such as an average or maximum (peak value) of the performance counter, is aggregated hourly based on these data samples. The respective statistical value representing value the performance counter component today is determined based on these hourly data points. The value the performance counter component today, referred to as a trend point, can be a statistical value determined over all stored hourly data points over the entire month ending today. Alternatively, the trend point is determined based on a shorter time period, for example just based on aggregated performance counter data points concerning a week or even a single day.

The baseline trend is based on like trend points obtained daily over a longer time period, such as three months. The baseline trend time period preferably immediately precedes the time period of the current trend. Alternatively, the time period of the baseline trend can at least partially overlap with the time period of the current trend. In this context, a time period is considered significantly longer if it is at least 3 or 4 times as long as the reference time period. In order to make the baseline trend properly comparable with the current trend, length of the time period used for calculating the baseline trend should be equally long as the time period covered by the current trend. This can be achieved for example by dividing the baseline data points into a plurality of sub-trends, each covering a time period that equals in length the time period of the current trend and calculating an average of these sub-trends to be used as the baseline trend. For example, if the baseline trend is based on data points over three months and the current trend is based on data points over one month, the baseline trend may be determined by first determining three different sub-trends each covering a time period of one month, and calculating an average of these sub-trends to be used as the baseline trend. The three sub-trends are preferably consecutive in time so that the entire three-month period of data points is used for determining the baseline trend.

For obtaining a meaningful statistical input for determining wanted performance counter components, data points of the performance counter are in this example aggregated hourly based on individual data samples obtained for example every minute. As understood by a skilled person, the more data samples and data points the more accurate statistics but increasing number of data samples and/or data points and/or decreasing time period between obtaining data samples and/or data points also increases computational load. In tested DBMS systems, using hourly data points and aggregating these into daily representative performance counter component values forming trend points of the current and baseline trends has been empirically found to provide good early warning capability without excess computational load, since, as known in the art, DBMS systems are as such designed to handle large amounts of data.

Exemplary useful performance counters available from a typical DBMS system are average CPU usage %, maximum CPU usage %, average processor queue, maximum processor queue, average PLE, maximum PLE, average IOPS, maximum IOPS, average RAM utilization, maximum RAM utilization, average throughput, maximum throughput. Any known performance counter is applicable.

For the analysis, data points collected on workload of selected performance counters is processed to determine respective performance counter components. In a typical DBMS system, performance counters are monitored continuously, for example every minute. For purpose of the invented method, performance counter data is aggregated, preferably on hourly basis, into data points. Aggregation of performance counter data refers to determining one or more representative values of each performance counter for each aggregation time period. For example, performance counter data samples collected every minute are aggregated on hourly basis to obtain wanted performance counter data point, which is itself typically a statistical value such as an average, median, maximum or minimum value of the respective performance counter samples. Aggregated hourly performance counter data points are stored for further use.

Examples of the most useful performance counter components are:

Slope: Does the slope of the selected performance counter workload change? A trend of a linear regression slope of a performance counter workload is determined from collected data points over the current time period, such as a month, and compared to the respective baseline trend determined based on data points on the same performance counter collected over a longer baseline time period, which preferably occurred immediately before the time period of the current trend.

A linear regression model is determined as $y=bx+a+\varepsilon$, wherein b is the slope of the regression line, which is the rate of change for y as x changes. In a DBMS system, x is a time dimension and y is the respective performance counter workload value. In most performance counters, a positive slope is bad, and a negative slope or no slope at all is good and needs no action. If the current trend has a more positive slope than the baseline slope, things may be going in a bad direction. Thus, even a light increase in the slope may be an early indicator of forthcoming problem, which would not be easily detectable from observing just individual data points. A steep positive slope indicates a severe workload problem such as CPU spill.

Volatility: Does volatility of the performance counter workload change? A trend of volatility of the performance counter is determined based on respective data points over the current time period, such as a month, and compared to the respective baseline trend determined over the longer baseline time period. Monthly volatility can be calculated by using standard deviation (STDEV) of the natural logarithm of the specified expression (LOG) of current month value divided by the baseline trend, which translates on any time dimension level such as hour, day and month into:

1. Calculate the mean of the data set
2. Calculate the difference between each data value and the mean
3. Square the deviations
4. Add the squared deviations together
5. Divide the sum of the squared deviations by the number of data values A higher result of this equation means higher volatility. Higher volatility may refer to intermittent performance issues on the respective performance counter workload such as bad SQL queries and thus, an increasing trend of volatility is useful as basis for warning and/or alerts. Warning or alert is determined based on respective thresholds, which are determined as a degree of change of the current trend in comparison to the baseline trend, while the deviation can be determined as an absolute deviation from the baseline trend or as a percentage difference from the baseline trend. Skewness: Does skewness of the performance counter workload change? The known concept of skewness is illustrated in the FIG. 1. A positive skew means that most values in the statistical distribution fall on low values and a negative skew means that most values in the statistical distribution fall on high values. In the current system, a trend of the skewness value is determined based on respective performance counter data points over the current time period, such as a month, and compared to a baseline trend determined over a longer baseline time period, as explained with the slope above.

Positive skew can be detected by inspecting whether the mean value of distribution is higher than median and/or whether median is higher than mode (MEAN>MEDIAN>MODE). Additionally or alternatively, it may be evaluated how skewed the workload is, for example by calculating Pearson's second skewness coefficient Sk2=3*(MEAN−MEDIAN)/STDEV, which indicates median skewness, and comparing that to the respective baseline trend. Abbreviation STDEV refers to standard deviation.

In most computing system performance counters, negative skew is bad and positive skew is good and needs no action. Negatively skewed distribution indicates more dense higher utilization levels of the workload over time and therefore may be an indicator of a potential threat on performance.

Kurtosis: Does the kurtosis of the performance counter workload change? A trend of the kurtosis value is determined based on data points of the respective performance counter over the current time period, such as a month, and compared to a baseline trend collected over a longer baseline time period, for example three or four months.

Figure 2:
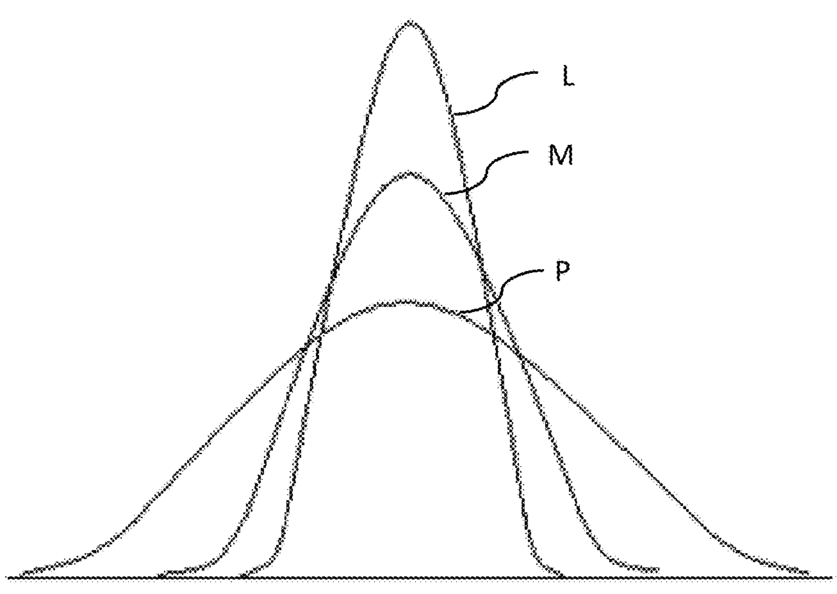
FIG. 2 illustrates basic types of kurtosis.

The FIG. 2 illustrates basic types of kurtosis, referred in the art as a leptokurtic distribution (L), a mesokurtic distribution (M) and a platykurtic distribution (P). A platykurtic distribution (P) has kurtosis less than normal distribution, wherein kurtosis is:

$$n * \sum_i^n (Y_i - \overline{Y})^4 / \left(\sum_i^n (Y_i - \overline{Y})^2\right)^2.$$

A platykurtic distribution indicates that the workload distributes over bigger values with higher volume over time and therefore detecting a platykurtic distribution of a performance counter component may be an indicator of potential threat on performance, if values get higher over time.

In the invented method, change of a statistical characteristic of workload on the performance counter, determined as a change of the current trend with respect to the baseline trend of the selected performance counter is used as basic metric. This change is preferably expressed as percentage or as an absolute value. Any suitable metrics can be used as values of performance counter components, and different metrics can be used for different performance counters and/or different performance counter components. One target is to visualize the outcome for the DBA, numerical values of metrics. Visual indicator of early warning can be implemented graphically, such that any numerical values can even remain internal in the system and thus not necessarily shown to the DBA in the user interface, but numerical values may also provide additional information to a skilled DBA. Threshold values for determining when a warning, alert and/or critical alert is to be given for any of the performance counter components are preferably design options, however in specified order of magnitude of risk, a lower risk being associated with a warning and a higher risk being associated with an alert. Alerts may also be given at different severity levels, such as alert and a critical alert. A warning or an alert of any performance counter component is triggered based on respective warning and alert thresholds, which are determined as a degree of change of the current trend in comparison to the baseline trend. The threshold values can be determined as an absolute deviation from the baseline trend or as a percentage difference from the baseline trend. Warning and alert thresholds are preferably determined from the long-term baseline trend. Any statistical method may be used for this. A non-limiting example is to calculate a threshold for an alert as average of the maximum and the average of the respective baseline trend and to calculate a threshold for a warning as average of the average and the above-calculated average of the maximum and the average of the respective baseline trend. The baseline trend is updated periodically, for example daily. Thus, also the threshold values for warning and alert are preferably updated periodically, and the threshold values are preferably determined over data points covering the same sliding window as the baseline trend.

The basic idea is to follow trends of all selected performance counter components to be able to identify if any of the trends are increasing and therefore indicating potential risk caused by a workload change. If all performance counter components, such as 4/4 or 3/3, have an increasing trend, in other words are increasing over time in an amount that is considered as warning or alert, the respective performance counter is overall more at risk than if only a fraction of performance counter components, such as 3/4, 2/4 or 1/4 in case of four performance counter components, or 2/3 or 1/3 in case of three performance counter components, increases simultaneously. Threshold level for giving a warning and/or giving an alert is preferably a design option as long as the basic rule that an alert indicates higher level of risk than a warning. On the other hand, if any of the selected performance counter components, has a steep increasing slope of a linear trend or the growth trend is exponential ($y=ab^x$ where $a \neq 0$), this should rise an early warning, due the rapid workload change.

Figure 3:
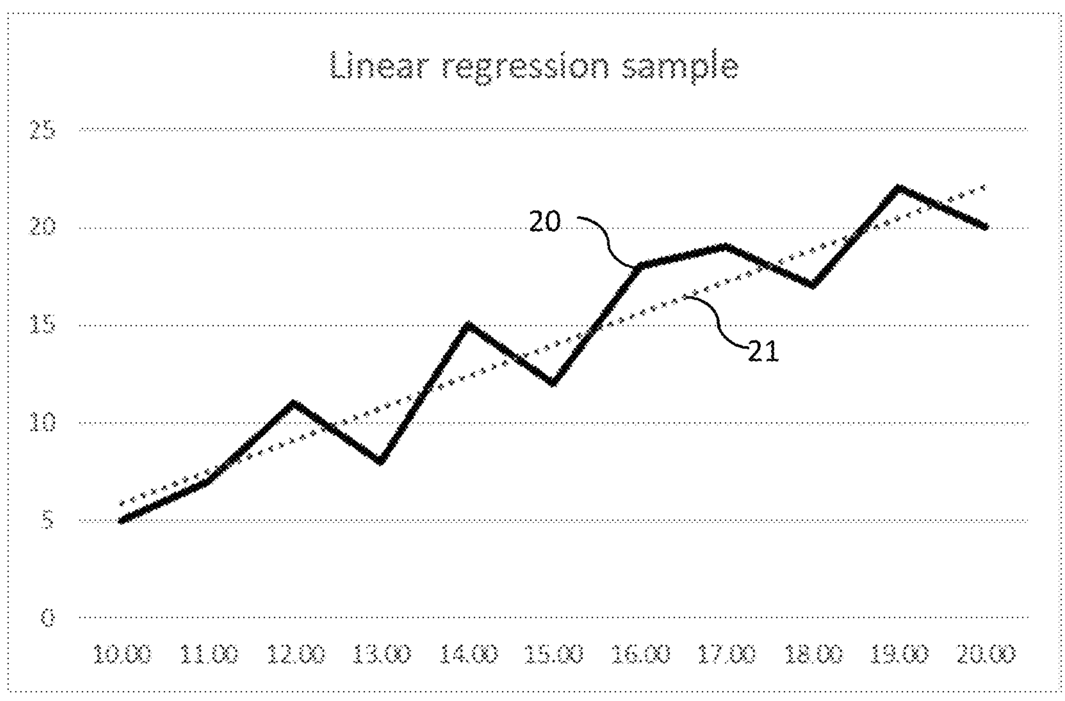
FIG. 3 illustrates schematically a time series of a performance counter component.

The FIG. 3 illustrates schematically a time series of an actual performance counter component (20). In this case, the time series and the current trend covers a time period of ten days, but any time period can be selected. In a typical DBMS system, current trend determined for a time period of a full month, i.e. 30 days has been found to provide effective and reliable early warning capability. Trend points of the performance counter component are determined daily based on respective, hourly obtained and stored data points, and the current trend (21) of the performance counter component is determined based on consecutive trend points by linear regression, the current trend having a determined, constant slope.

Figure 4:
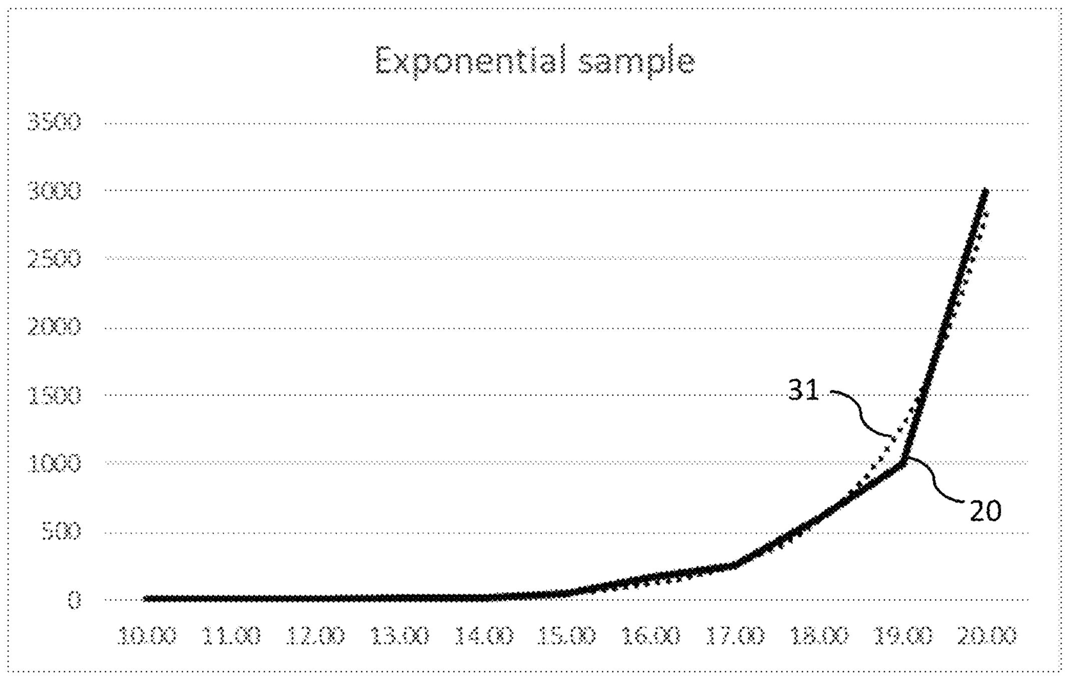
FIG. 4 illustrates schematically another time series of a performance counter component.

The FIG. 4 illustrates schematically another time series of an actual performance counter component (20) represented by a plurality of consecutive trend points which are determined daily based on hourly obtained data points, and a current trend (31) with an exponential growth. Such exponential growth trend of any individual performance counter component would typically trigger an alert or a critical alert, if such severity level is in use in the system.

Figure 5:
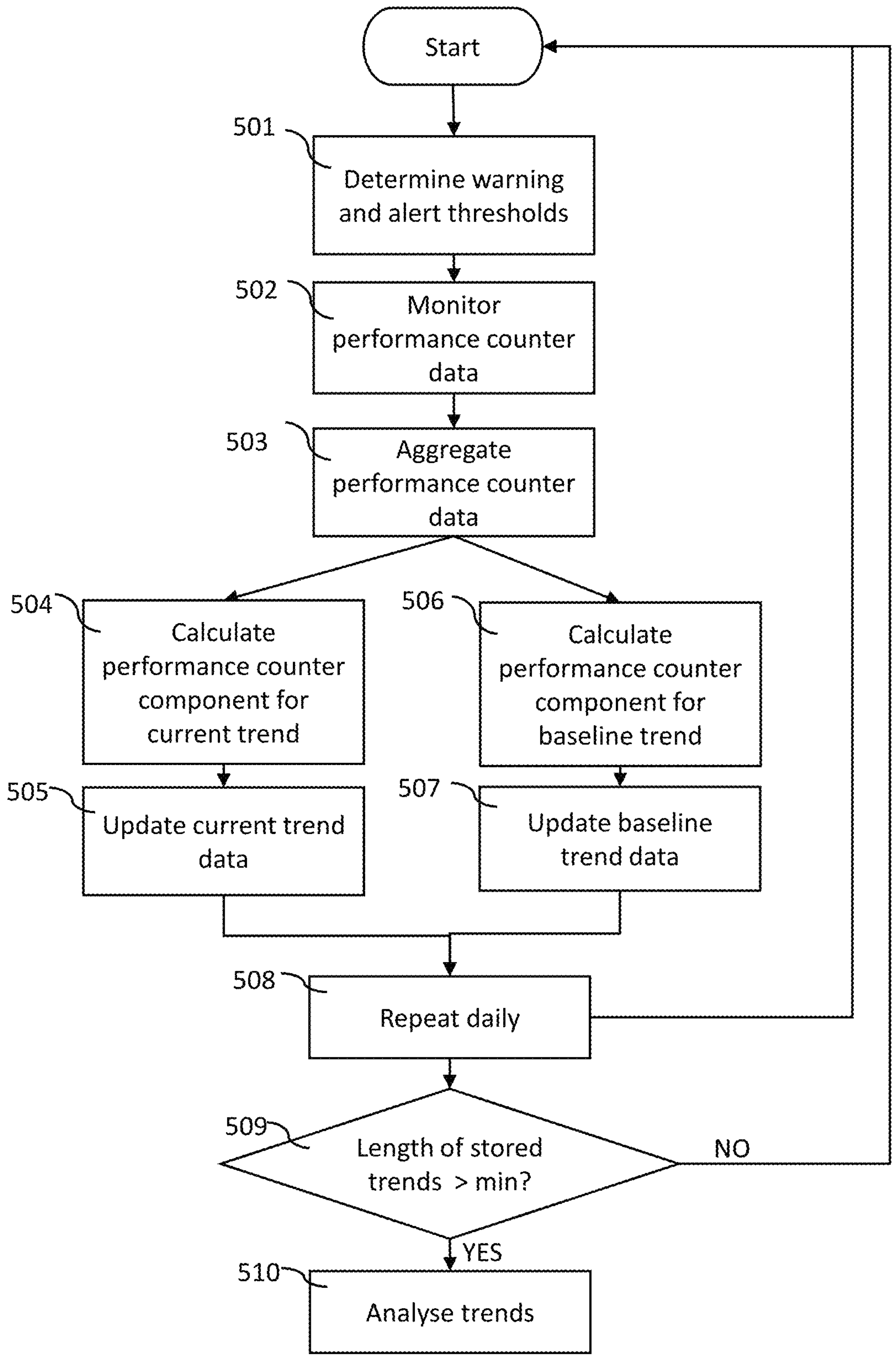
FIG. 5 illustrates steps for generating trend data.

Alerts are preferably given to an individual performance counter in following situations:

- If the individual performance counter component is on exponential trend
- If the individual performance counter component is on linear trend that is or is forecasted during next month to reach or exceed a predetermined threshold level based on the respective baseline trend The FIG. 5 illustrates steps for generating trend data. In the step 501, warning and alert thresholds are determined. These thresholds can be updated later on, but this is of course not necessary so this step will be optional on subsequent process rounds, after the thresholds have been determined. When the warning and alert thresholds are determined mathematically, preferably statistically, on basis of the baseline trend, thresholds are preferably determined/updated every time the baseline trend is updated. Thus, if the baseline trend is updated daily, also the thresholds are re-calculated daily.

In the step 502, performance counter data is monitored. A new performance data sample can be collected for example every minute. Any known performance counter is applicable.

In the step 503, performance data samples are aggregated into performance data points. A performance data point is typically a statistical value determined based on performance data samples obtained over a period of time. In a typical example, performance data point represents a maximum, average or median of the performance data point over a first time period, which may be for example an hour.

In the step 504, a new trend point is calculated for the performance data component to be used in the current trend, based on performance data points. The new trend point is preferably a statistical value determined over a second time period, which is longer than the first data period. For example, the trend point may be determined based on all data points of the respective performance counter over period of a month preceding today. In the step 505, the current trend point is used for updating current trend data. The current trend data preferably covers a time period that equals the second time period, such that when the new trend point is added in the current trend, the oldest trend point is discarded that the current trend is calculated based on trend points included in the updated set of trend points.

In the step 506, a new trend point is calculated to be used in the baseline trend. Basic calculation is similar to the step 505, but the baseline trend is calculated over data collected during a third time period, which is significantly longer, i.e. at least 3 or 4 times longer than the second time period. The new trend point for the baseline trend is stored for later use.

In the step 507, the baseline trend data is updated. In the preferred embodiment, the baseline trend is determined based on a time period that precedes the current time period. Thus, if the second time period is one month and the third time period is three months, the baseline trend is determined based trend points, which were stored during a period between one month and four months before now. When baseline trend data is updated, oldest trend point is discarded and a new trend point is included in the baseline trend data that was determined at the same time (i.e. on the same day) as the respective oldest trend point of the current trend that is today discarded.

In the flow chart, steps 504 and 505 are performed in parallel with steps 506 and 507. However, these pairs of steps can be performed consecutively, such as 504, 505, 506, 507 or 506, 507, 504, 505.

The entire process from steps 503 to 508 is preferably repeated daily, as shown by the step 508. This way, both the current trend and the baseline trend receive daily a respective new trend point, while the oldest trend point is discarded daily.

Before a meaningful comparison of current and baseline trends can be performed, both trends shall have a predetermined minimum of trend points. Step 509 illustrates a step of checking whether the stored current trend and the stored baseline trend both have a length of a respective minimum value. The process therefore preferably proceeds to step 510 of analyzing trends of the performance counter component only after both trends fulfill a respective minimum trend length criterion. Since the baseline trend is determined over a longer period of time, also the minimum length criterion for the time period covered by the stored baseline trend data is assumed to be longer than the minimum length criterion for the time period covered by the stored current trend data.

Figure 6:
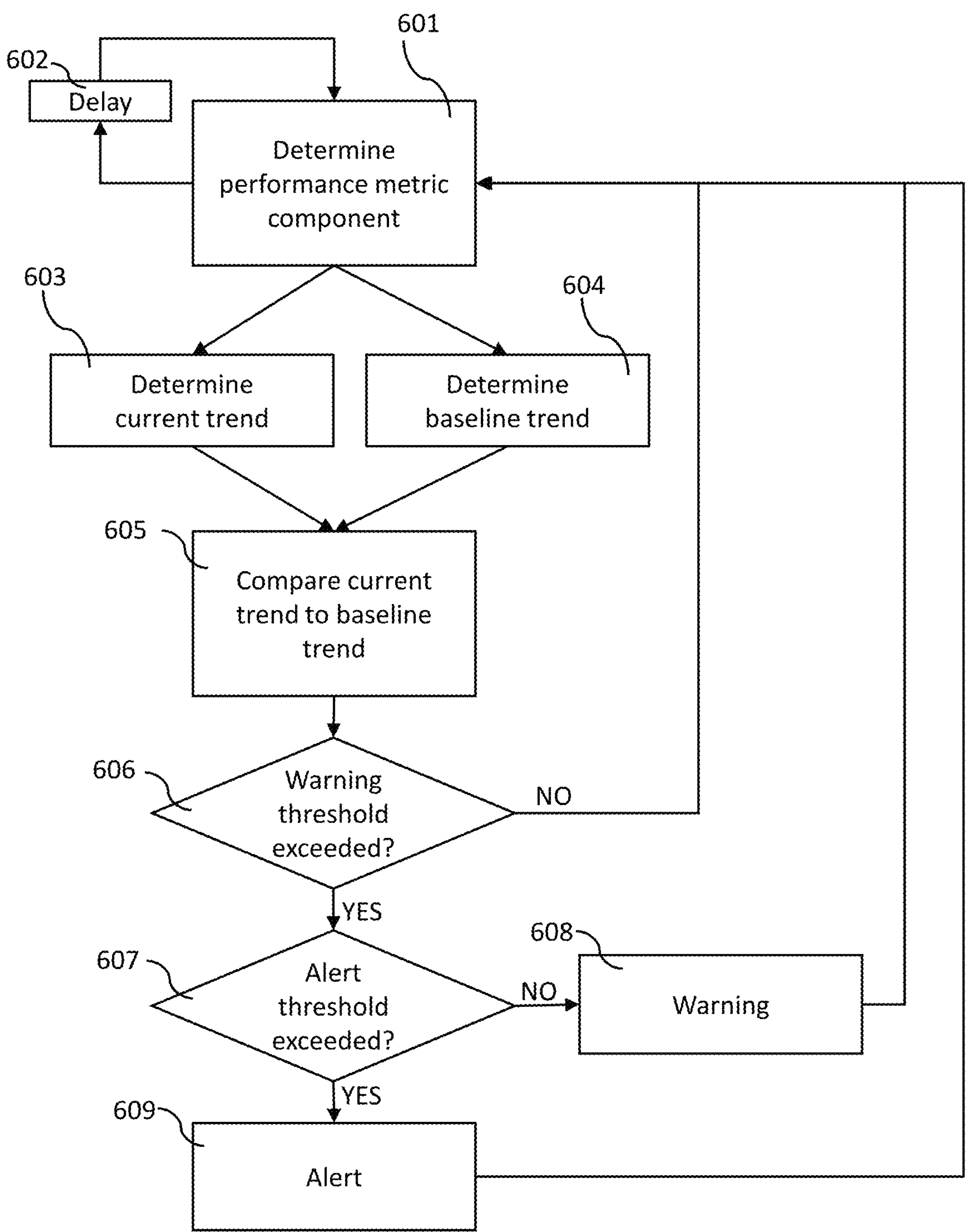
FIG. 6 illustrates a processing an individual performance metric component.

The FIG. 6 illustrates a processing an individual performance metric component.

The step 601 corresponds steps shown in the FIG. 5, in which trend points for the performance metric component are determined, by obtaining a plurality of respective performance metrics and determining the respective performance metric component over a time period.

The performance metric component is determined periodically, preferably daily, which is illustrated by the delay 602.

In the phase 603, the current trend is determined over a predetermined current trend time period, referred also as the second time period. For example, the current trend is determined for last month or last 30 days, which is a sliding window. In the phase 604, the baseline trend is determined over a predetermined baseline trend time period, which is significantly longer than the current trend time period. The baseline trend time period is also referred to as the third time period. In this example, current trend and baseline trend are determined in parallel, but these can be determined in any order.

In the phase 605, the current trend is compared to the baseline trend. This comparison leads to a series of decision steps, here illustrated with step 606, in which it is detected, whether the workload increases, which is detected by determining that the current trend deviates from the baseline trend. If there is no increase in the workload, the process returns to start. Increase of workload that needs to be addressed may be determined as a change in the performance counter component's current trend exceeding a threshold set for warning, which threshold may be an absolute deviation from the baseline trend or a percentage difference between the current trend and the baseline trend.

In case there is a slope, exceeding a threshold may also be determined based on a predicted future value of the performance counter component, which can be extrapolated from the current trend.

If an increase of workload is detected, it is then it is further checked, in the phase 607, whether the increase is critical or not by comparing the current trend to a threshold value determined for alerts. If the change in the difference falls between the warning threshold value and the alert threshold value, a warning is given (step 608) and if the change in the difference exceeds the alert threshold value, an alert is given (step 609).

Similar performance counter component analysis is performed for a plurality of performance counters, using at least two, possibly three or four different performance counter components for each performance counter.

The FIG. 7 illustrates simple example of an early warning user interface implemented as "traffic lights" shown in a table, in which no warning of a performance counter component is indicated with a "green light" (G)

a warning of a performance counter component is indicated with a "yellow light" (Y) and an alert of a performance counter component is indicated with a "red light" (R)

This exemplary user interface table shows a Source, with refers to a specific database by its name, a Counter, which refers to a specific performance counter, and three performance counter components determined for each of the performance counters. In this example, applied performance counter components are "Slope", "Volatility", "Skew", and "Kurtosis". The user interface in this example is provided with numerical values representing respective determined percentual change from the respective baseline trend shown next to the respective traffic light. This kind of visual user interface provides the DBA quickly an overview of whether there could be some problems predicted for the DBMS in future.

For each performance counter (Counter), an early warning is categorized based on detecting number of individual performance counter components that give a warning or alert.

1) How many performance counter components have an alert or a warning (0-4/0-3)

2) How many performance counter components have an alert (0-4/0-3)

3) How many performance counter components have a warning (0-4/0-3)

This categorization can be visualized in a user interface provided to a DBA for example with performance counter component-specific "traffic lights", which indicate three levels of criticality:

1) Green=Individual performance counter component not warning

2) Yellow=Individual performance counter component warning with minor trend change 3) Red=Individual performance counter component alerting with major trend change If any of the performance counter components is/are alerting, which can be indicated by a red traffic light in the user interface, the early warning system gives preferably an alert, which is more critical than a warning. Furthermore, alerts can be categorized into a number of alert categories, such as A1, A2, A3, A4. Here A4 represents highest criticality, and it is given if all four performance counter components alert. Warnings can be categorized to a number of warning categories, such as W1, W2, W3, W4, wherein W4 indicates that all four performance counter components give a warning. A warning indicates that the performance counter component changes, but this change is not considered critical. The overall alert can be a combination of (A0 . . . A4 && W0 . . . W4), wherein A0W0 is no risk and A4W4 is highest risk. The above categorization example is given using four performance counter components as example, but the same type of combinatorial categorization can be applied to any number of categories, depending on number of selected performance counter components supervised.

In addition, or instead of user interface, early warnings may be provided as data signals to a resource management system that can take automated measures to prevent predicted performance counter components from becoming a problem.

FIGS. 8a to 8d illustrate baseline trends and current trends of four different performance data components. Each trend point (80a, 80b, 80c, 80d, 80e, 80f) of the current trend (80) represents a single statistical value calculated based on data points stored during the previous month (or any other selected length of second period), until the respective date on which the respective trend point is stored. Each trend point (81a, 81b, 81c, 81d, 81e, 81f) of the baseline trend (81) represents a single statistical value calculated based on data points stored over three months (or any other selected length of third period longer than the second period) preceding data points corresponding to the current trend on that date. For example, if current date is May 4, 2022, second period is one month and third period is three months, data points for current trend point stored today are those stored between Jun. 3, 2022 and May 4, 2022, and data points for baseline trend point stored today are those stored between Jun. 12, 2021 and May 3, 2022. Thus, each trend point is determined based on slightly different data points using a sliding window.

In each FIGS. 8a to 8d, trend points (80a, . . . , 80f) of the current trend represent daily calculated values of the respective performance counter component determined based on data points over the sliding window one-month current trend period. Trend points (81a, . . . , 81f) of the baseline trend represent daily calculated values of the respective performance counter components one month before the respective current trend points, based on data points over the sliding window three-month baseline time period.

Difference between daily trend points of the current trend and baseline trend determines the change between the two trends, which is used for determining warnings and/or alerts. If a warning or alert threshold is exceeded, change of the current trend can further be estimated for example with R-squared ($R^2$) analysis for determining whether the detected unfavorable change is linear or exponential in nature. Based on a plurality of recent trend points of the current trend, future trend points of the current trend may be predicted based on a plurality of recent trend points for next few days by extrapolation. For example, last three, four, five, six or seven trend points of the current trend may be used for such prediction. Thus, even a slight increase in the slope of the current trend may be an early indicator of a forthcoming problem in the system, which would not be easily detectable from observing just individual data points. A steep positive slope indicates a severe workload problem such as CPU spill.

Figure 8A:
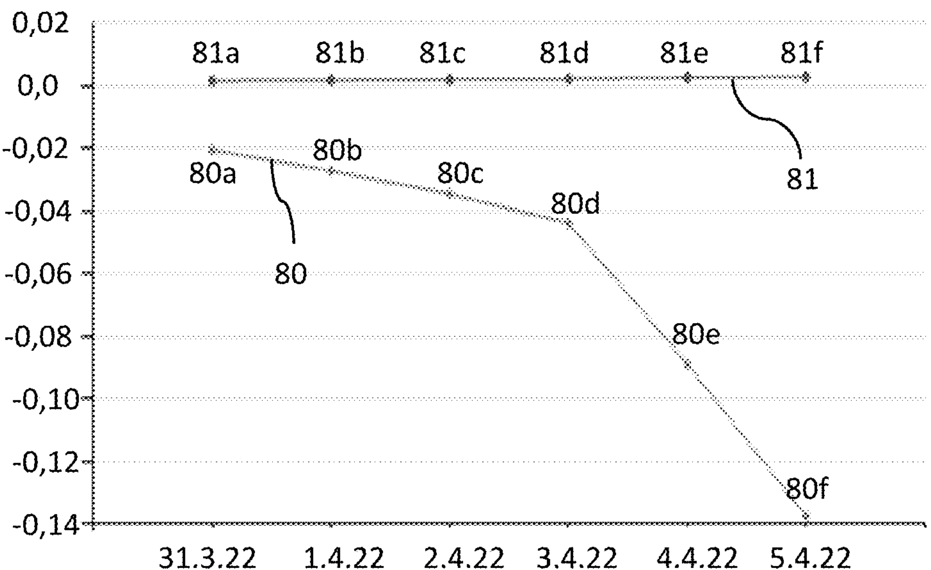
FIGS. 8A, 8B, 8C and 8D illustrate baseline trends and current trends of four different performance data components.

The FIG. 8a shows an exemplary baseline trend (81) and current trend (80) for slope. Trend points (80a, . . . , 80f; 81a, . . . , 81f) are determined and stored in this example daily. In this example, the baseline trend (81) is almost constant, i.e. slope of the performance counter did not change much during the third time period covered by the baseline trend (81). However, the current trend (80) deviates from the baseline trend (81) almost exponentially, but rather than growing, the trend gets smaller.

Figure 8B:

The FIG. 8*b* shows an exemplary baseline trend (81) and current trend (80) for skew. Skew of this performance counter experiences clear changes in comparison to the baseline.

Figure 8C:
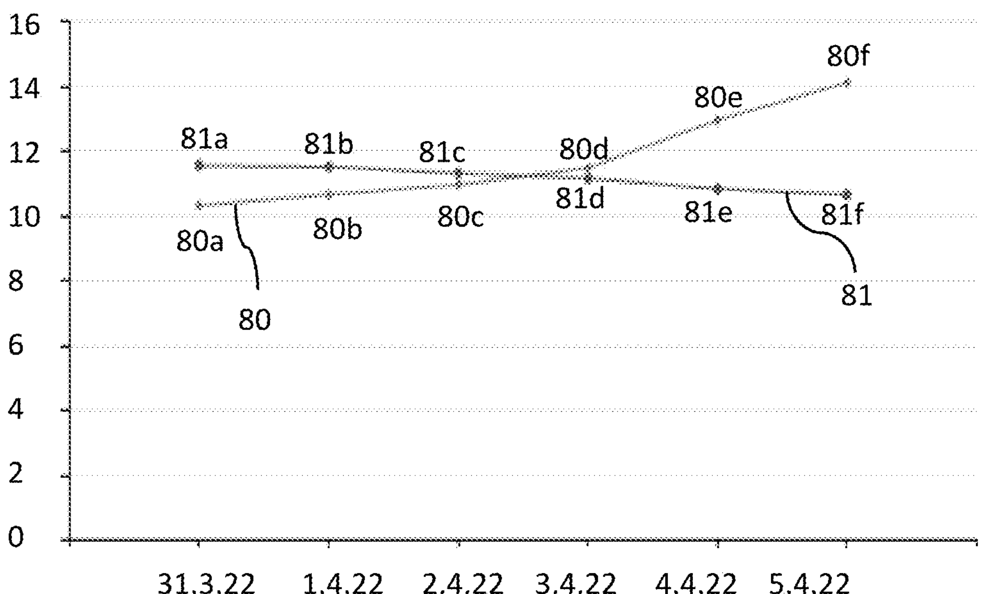

The FIG. 8*c* shows an exemplary baseline trend (81) and current trend (80) for volatility. Volatility of this performance counter has increased recently, which may indicate a problem in future and may trigger a warning or alarm on this performance counter component.

Figure 8D:
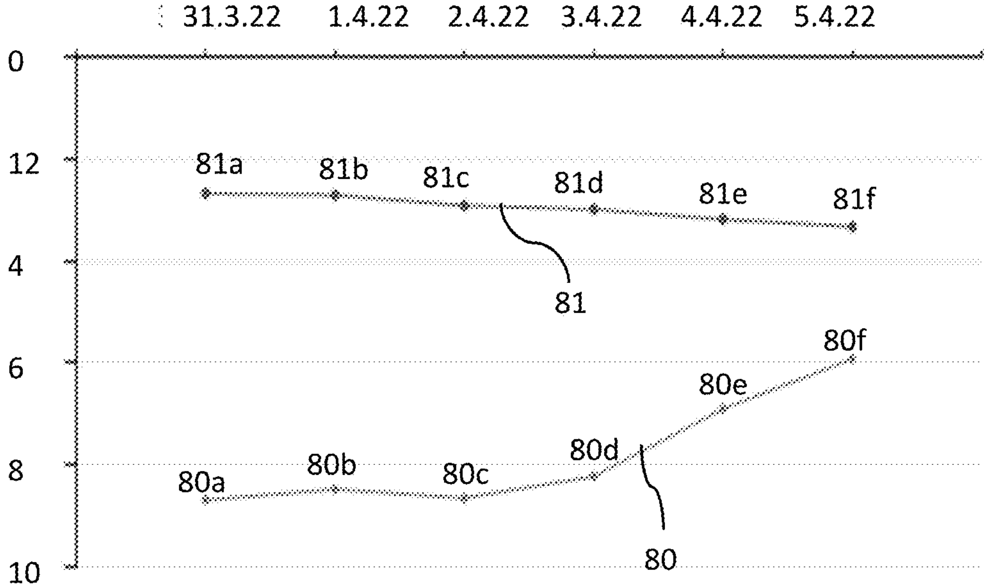

The FIG. 8*d* shows an exemplary baseline trend (81) and current trend (80) for kurtosis. The current trend indicates that kurtosis has recently been quite different from the baseline, but it approaches the baseline.

Applicable Use Cases Based on the Disclosure

A goal of the early warning method is to leave enough time to react and make any necessary adjustments for preventing the predicted future database performance problem related to any one of the performance counter components that are being supervised by the early warning system. The above-described early warning mechanism can predict problems for several days or weeks before the actual problem actualizes. Details of preventive actions vary between types of predicted problems and on the operation platform of the DBMS system but share common characteristics. Examples of preventive actions are described below in connection to various use cases.

A host refers to computing resources used for running the DBMS system. The host may be a physical server or a virtual machine (VM) running in a virtual machine cluster. A virtual machine may utilize physical on-premises servers and/or computing resources provided by a public cloud computing environment.

In a datacenter environment where the current host is a VM, VM capacity can be adjusted in advance to match the future needs, based on any received early warning. For example, if there is an early warning on VM CPU usage percent, then the action is to add more virtual cores to the VM. If the CM cluster has insufficient capacity for adding virtual cores to the VM, then the entire VM can be transferred from the current host to another host in the virtual machine cluster that has sufficient capacity to avoid the predicted problem. Another example, if there is an early warning on processor queue usage, then the action is to add more cores to the VM. If the current host has insufficient capacity for that, then move the VM from the current host to another host in a cluster that has more free CPU capacity to avoid the predicted problem. This principle of predictively adding the specific type of resources (e.g., CPU, RAM, disk), the disclosed prediction method to tackle the predicted problem before it actualizes is applicable to all resource types that are followed by the early warning system, as well as any combinations of such resource types. Adjusting VM capacity can be fully automated, while providing the early warning also in a user interface facilitates supervision of such automated prevention of future problems by a system administrator or like. Increasing any type of capacity of the DBMS system may be implemented by utilizing publicly available cloud computing resources. The capacity increase may be permanent or temporary.

A system administrator or a service manager or like, human or automated, may order, rent, deploy and/or administrate more server and virtual machine capacity on-premises or from a public cloud computing environment as a hybrid cloud solution, depending on the specifically predicted additional capacity needs and anticipated costs triggered by the early warning. This also enables calculation of additional costs and electricity consumption needs on the current data center, therefore making the Total Cost of Ownership (TCO) calculations more accurate and predictable.

According to some embodiments, a correlation may be detected between a software version upgrade or a software patch and one or more early warnings. In this context, term software update refers to a major software version upgrade or a minor software patch. A trend in one or more analyzed time series may indicate that after applying the software upgrade, one or more of the supervised performance counter components start to generate early warnings. In such cases, identified correlation of the software upgrade and the subsequently determined early warning(s) may be used to determine that there was something wrong with the software upgrade, and automatic cancellation of the respective software upgrade may be performed, reverting the applied software to the previous software version that was used before the update. This facilitates more reliable operation of the DBMS system, while the cancelled software update can be revised and corrected before it is performed anew.

Yet another way to react to the early warning is a root cause analysis proceeded by a professional system administrator, a database administrator or an AI component is to guarantee that capacity shortage is not due to the poor code, indexing, server settings or some other hidden phenomenon, which can be fixed to eliminate or at least alleviate the need for extra capacity.

All in all, the disclosed prediction method reveals short-term future hardware and virtual host capacity bottlenecks on a private or public datacenter environment to minimize unplanned downtime and service breaks and/or degraded system performance.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A computer-implemented method for improving a performance warning in a database management system, DBMS, comprising:

collecting, by a processor of the DBMS, periodically a plurality of data samples concerning a plurality of performance counters of the DBMS, said performance counters comprising at least one of CPU usage and processor queue length, determining, by the processor of the DBMS, periodically one or more data points, wherein each data point represents a statistical characteristic of one of said performance counters, the statistical characteristic being one of average or peak value, and said statistical characteristic being determined based on a plurality of said data samples taken over a first time period, and storing said data points, based on a plurality of said data points, periodically determining and storing, by the processor of the DBMS, a trend point for each of a plurality of performance counter components, wherein the performance counter component represents a statistical characteristic of the respective performance counter, determined based on the plurality of data points stored over a second time period, wherein the performance counter component is selected from a group comprising slope, volatility, skewness and kurtosis, determining, by the processor of the DBMS, a current trend of each of the plurality of performance counter components based on a plurality of respective trend points, wherein the current trend comprises all trend points determined during the second time period, and wherein the second time period is longer than the first time period, determining, by the processor of the DBMS, a baseline trend for each of said plurality of performance counter components, wherein the baseline trend comprises a plurality of trend points of the respective performance counter component over a third time period, and wherein the third time period is longer than the second time period, comparing, by the processor of the DBMS, each determined current trend to the respective baseline trend, upon detecting a deviation of the current trend from the respective baseline trend that exceeds at least one threshold, categorizing, by the processor of the DBMS, the deviation into one of a plurality of severity classes selected from a group comprising a warning, an alert and a critical alert, providing, by the processor of the DBMS, an early warning of a possible future problem in the DBMS system based on number of said deviations concerning at least two different performance counter components of any single performance counter being categorized into at least one of said severity classes to improve early warning performance in the DBMS system, wherein the new trend point for the current trend is determined periodically based on all data points stored over duration of a sliding window having length of the second period, wherein the new trend point for the baseline trend is determined periodically based on all data points stored over duration of a sliding window having length of the third period, and in response to providing the early warning, increasing at least one capacity of a current host of the DBMS system, or moving the DBMS system to another host, for increasing capacity of the DBMS system for improving performance of the DBMS system with respect to the performance counter that caused the early warning.

2. The computer-implemented method according to claim 1, wherein thresholds applied to categorizing a deviation to one of the severity classes are determined individually for each DBMS performance counter component.

3. The computer-implemented method according to claim 2, wherein said thresholds applied for categorizing a deviation to one of the severity classes are adjusted using machine learning, wherein the machine learning is taught using historical performance counter data and actual performance problems detected in a DBMS.

4. The computer-implemented method according to claim 2, wherein said thresholds applied for categorizing a deviation to one of the severity classes are determined statistically based on the respective baseline trend.

5. The computer-implemented method according to claim 1, wherein an early warning is categorized based on number of said deviations being categorized into a warning and/or on number of said deviations being categorized into an alert and/or number of said deviations being categorized into a critical alert and/or total number of said deviations being categorized in any of the severity classes indicating an alert.

6. The computer-implemented method according to claim 1, wherein the first period is an hour or less than an hour, wherein new trend points are determined daily, wherein the second period is a month, and the third period is at least 3 months.

7. The computer-implemented method according to claim 1, wherein the third time period immediately precedes the second time period, or the third time period and the second time period mutually overlap such that the latest data points used for determining the last trend point of the current trend and the baseline trend are the same data points.

8. The computer-implemented method according to claim 1, wherein future development of the current trend is extrapolated based on a plurality of recent trend points of the current trend for predicting whether the current trend forecasts appearing of a problem in near future.

9. A computer program product comprising a non-transitory computer readable storage medium comprising computer executable code stored thereon, wherein the computer executable code, when executed by a computer or computer system, performs the method according to claim 1.

10. A non-transitory computer readable medium comprising computer executable code which, when executed by a computer or computer system, performs the method according to claim 1.

11. The computer-implemented method according to claim 1, further including in response to determining that the early warning was received after a software upgrade, canceling the software upgrade and reverting to a software version preceding the software update.

12. The computer-implemented method according to claim 1, wherein increasing the capacity of the DBMS system includes increasing capacity of a current host of the DBMS system.

13. The computer-implemented method according to claim 1, wherein increasing the capacity of the DBMS system includes moving the DBMS system to another host.

14. The computer-implemented method according to claim 1, wherein in response to providing the early warning, identifying the type of resource of the DBMS system that caused the early warning, and increasing capacity of the respective type of resource of the DBMS system for improving performance of the DBMS system with respect to the performance counter that caused the early warning.

15. A computer-implemented method for improving a performance warning in a database management system, DBMS, comprising:

collecting, by a processor of the DBMS, periodically a plurality of data samples concerning a plurality of performance counters of the DBMS, said performance counters comprising at least one of CPU usage and processor queue length, determining, by the processor of the DBMS, periodically one or more data points, wherein each data point represents a statistical characteristic of one of said performance counters, the statistical characteristic being one of average or peak value, and said statistical characteristic being determined based on a plurality of said data samples taken over a first time period, and storing said data points, based on a plurality of said data points, periodically determining and storing, by the processor of the DBMS, a trend point for each of a plurality of performance counter components, wherein the performance counter component represents a statistical characteristic of the respective performance counter, determined based on the plurality of data points stored over a second time period, wherein the performance counter component is selected from a group comprising slope, volatility, skewness and kurtosis, determining, by the processor of the DBMS, a current trend of each of the plurality of performance counter components based on a plurality of respective trend points, wherein the current trend comprises all trend points determined during the second time period, and wherein the second time period is longer than the first time period, determining, by the processor of the DBMS, a baseline trend for each of said plurality of performance counter components, wherein the baseline trend comprises a plurality of trend points of the respective performance counter component over a third time period, and wherein the third time period is longer than the second time period, comparing, by the processor of the DBMS, each determined current trend to the respective baseline trend, upon detecting a deviation of the current trend from the respective baseline trend that exceeds at least one threshold, categorizing, by the processor of the DBMS, the deviation into one of a plurality of severity classes selected from a group comprising a warning, an alert and a critical alert, providing, by the processor of the DBMS, an early warning of a possible future problem in the DBMS system based on number of said deviations concerning at least two different performance counter components of any single performance counter being categorized into at least one of said severity classes to improve early warning performance in the DBMS system, wherein the new trend point for the current trend is determined periodically based on all data points stored over duration of a sliding window having length of the second period, wherein the new trend point for the baseline trend is determined periodically based on all data points stored over duration of a sliding window having length of the third period, and in response to determining that the early warning was received after a software upgrade, canceling the software upgrade and reverting to a software version preceding the software update.

16. The computer-implemented method according to claim 15, wherein in response to providing the early warning, identifying the type of resource of the DBMS system that caused the early warning, and increasing capacity of the respective type of resource of the DBMS system for improving performance of the DBMS system with respect to the performance counter that caused the early warning.

* * * * *